United States Patent [19]

Jones et al.

[11] Patent Number: 5,048,111

[45] Date of Patent: Sep. 10, 1991

[54] HYBRID SUBBAND-BASED HIERARCHICAL STORAGE AND DISPLAY METHOD FOR HIGH RESOLUTION DIGITAL IMAGES IN A MULTIUSE ENVIRONMENT

[75] Inventors: Paul W. Jones, Churchville; Paul W. Melnychuck, W. Henrietta, both of N.Y.

[73] Assignee: Eastman Kodak Company, Rochester, N.Y.

[21] Appl. No.: 432,293

[22] Filed: Nov. 6, 1989

[51] Int. Cl.$^5$ ............................................. G06K 9/00
[52] U.S. Cl. ................................... 382/56; 382/49; 358/426; 358/133
[58] Field of Search ............ 358/12, 13, 21 R, 141, 358/160, 448, 450, 467, 426, 133; 382/49, 56

[56] References Cited

U.S. PATENT DOCUMENTS

| | | | |
|---|---|---|---|
| 4,682,869 | 7/1987 | Itoh et al. | 358/426 |
| 4,718,104 | 1/1988 | Anderson | 382/41 |
| 4,817,182 | 3/1989 | Adelson et al. | 382/56 |

Primary Examiner—John W. Shepperd
Attorney, Agent, or Firm—Edward Dugas

[57] ABSTRACT

An image processing method is described for the hierarchical storage and display of high resolution digital images in a multiuse environment. The method makes reduced resolution versions of the original image available for quick display on video monitors while providing access to the full resolution image for making photographic quality hardcopies. This multiresolution method also provides for the efficient storage of the data resulting from the use of this method via a hybrid coding scheme. Several embodiments of the method are described.

24 Claims, 17 Drawing Sheets

HYBRID SUBBAND-BASED HIERARCHICAL STORAGE AND DISPLAY METHOD FOR HIGH RESOLUTION DIGITAL IMAGES IN A MULTIUSE ENVIRONMENT

TECHNICAL FIELD OF THE INVENTION

The present invention is related to a method of storing and displaying digital images and more particularly to a multiresolution method which makes available reduced resolution versions of original images for quick display and full resolution original images for making photographic quality hardcopies.

BACKGROUND OF THE INVENTION

An image processing method will be described for the efficient storage and display of high resolution digital images in a multiuse enviroment. A multiuse environment is one where the user has the option of selecting the type of display medium and the desired resolution on this medium. In particular, two types of display media are considered: video monitors and photographic hardcopies. Versions of an original digital image are made available at various resolutions to allow for the display of an HDTV quality image on video, an NTSC quality image with PAL/SECAM compatibility on video, and a sub-NTSC quality image on video, as well as a very high quality image on photographic hardcopies. However, it is important to note that the techniques described herein are not limited to these display media or resolutions.

The present invention uses a multiresolution or hierarchical structuring of the image data to allow for rapid access to the various image formats. It is also desirable to encode this hierarchical image data in an efficient manner so as to reduce the storage requirements on the digital storage media, e.g., optical discs or magnetic tape, and to allow for the rapid transfer of the image data from the storage media to an output device. Furthermore, it is desirable to minimize the hardware required to implement such a system. In particular, it is desirable to minimize the hardware required to access the lower resolution images along with its cost. Systems which use a hierarchical structuring of the image data are often termed progressive transmission since they allow image quality to be progressively refined; however, they are generally not designed specifically for a multiuse environment.

PRIOR ART

A number of hierarchical structures for image coding and/or progressive transmission have been described in the open technical literature and in various patents. Of particular relevance to the present invention are the following publications:
P. J. Burt and E. H. Adelson, "The Laplacian Pyramid as a Compact Image Code," IEEE Trans. Commun., COM-31, 532-540 (1983).
J. W. Woods and S. D. O'Neil, "Subband Coding of Images," IEEE Trans. Acous. Speech Signal Proc., ASSP-34, 1278-1288 (1986).
A. C. Luther, "Digital Video in the PC Environment," McGraw-Hill Book Company, New York, 81-86 (1989).
and the following patents:

U.S. Pat. No. 4,709,394, entitled "Multiplexed Real-Time Pyramid Signal Processing System", by Bessler et al.: 11/24/87.
U.S. Pat. No. 4,674,125, entitled "Real-Time Hierarchical Pyramid Signal Processing Apparatus," by Carlson et al., 6/16/87.
U.S. Pat. No. 4,718,104, entitled "Filter-Substract-Decimate Hierarchical Pyramid Signal Analyzing and Synthesizing Technique," by Anderson, 1/5/88.
U.S. Pat. No. 4,682,869, entitled "Image Processing system and Method," by Itoh et al., 7/28/87.
U.S. Pat. No. 4,817,182, entitled "Truncated Subband Coding of Images," by Adelson et al., 3/28/89.

Referring to FIG. 1, the publication by Burt et al. teaches an encoding method for images termed either the Laplacian pyramid or the Burt pyramid. In this technique, the original image $G_0$ is lowpass filtered (LPF), and this lowpass image is subsampled to take advantage of its reduced bandwith to provide the image $G_1$. This process of lowpass filtering and subsampling is repeated three times to generate a hierarchical structure, or pyramid, of images ($G_0$, $G_1$, $G_2$, and $G_3$) of successively smaller dimensions. Although four resolution levels are shown, more or less can be used, depending upon the application. Except for the final level, each lowpass image in this pyramid is then expanded to the dimensions of the next higher level by upsampling (inserting zeros) and filtering to form a prediction image for that level. This prediction image is substracted from its corresponding lowpass image in a substractor to generate difference, or residual, images $L_0$, $L_1$, and $L_2$. At the final level, the residual image is defined to be equivalent to the residual image, i.e., $L_3 = G_3$. The residual images corresponding to the levels of the lowpass pyramid form another pyramid which is termed either the Laplacian or Burt Pyramid. This technique is motivated by the fact that the residual images have a reduced variance and entropy compared to the original or lowpass images and may be quantized and entropy encoded to provide efficient storage of the data. The encoded residuals are denoted $\hat{L}_0$, $\hat{L}_1$, $\hat{L}_2$, and $\hat{L}_3$. Reconstruction is performed by interpolating the decoded lowpass image at the bottom of the lowpass pyramid and adding in the corresponding decoded residual to generate the next level in the lowpass pyramid. This process is iterated until the original image size is reached; the decoding process is illustrated in FIG. 2. A progressive improvement in reconstructed image quality and resolution can thus be obtained by displaying the reconstructed lowpass filtered image at each level of the pyramid, i.e., $\hat{G}_3$, $\hat{G}_2$, $\hat{G}_1$, and $\hat{G}_0$. Note that errors introduced in the encoding processing are propagated from one level to the next higher level.

The patent to Anderson (U.S. Pat. No. 4,718,104) teaches a modification of the Burt pyramid scheme in which the lowpass filtered image is substracted directly from the image at the previous level and then subsampled; it is not decimated and interpolated prior to substraction as in the Burt pyramid. This technique is termed the filter-substract-decimate (FSD) pyramid. The primary advantage of this technique is a reduction in the hardware required to generate the pyramid.

The patents by Bessler et al. (U.S. Pat. No. 4,709,394) and Carlson et al. (U.S. Pat. No. 4,674,125) teach specific real-time implementations of the Burt pyramid or the FSD pyramid.

The patent by Itoh et al. (U.S. Pat. No. 4,682,869) essentially teaches the method of the Burt pyramid, albeit for the specific case of the multiuse scenario. The main advancements in the patent by Itoh et al. seems to be specific methods for forming the prediction image used to generate the residual image and methods for encoding the residual, particularly for the case of binary images.

Referring to FIG. 3, the publication by Woods et al. teaches an encoding method for images termed subband coding. In subband coding, the original image X is decomposed into a number of overlapping frequency bands, generally by using a set of 1-D lowpass (LPF) and highpass (HPF) quadrature mirror filters (QMFs). The filtered images representing these frequency subbands have a reduced bandwith compared to the original image and can thus be subsampled, generally by a factor of two in each dimension. The formation of four subbands is illustrated in FIG. 3, and the subbands are denoted as $Y_{LL}$, $Y_{LH}$, $Y_{HL}$, and $Y_{HH}$ where the subscripts indicate which filters (L for lowpass and H for highpass) were used in the x- and y-directions, respectively, to generate the subband. In the publication by Woods et al., each subband is further decomposed into smaller subbands by repeated filtering and subsampling to form a total of 16 subbands. The subbands are then encoded using standard techniques such as differential pulse code modulation (DPCM), vector quantization (VQ), or entropy coding. This process is illustrated in FIG.4 where the encoded subbands are denoted $\hat{Y}_{LL-LL}$, $\hat{Y}_{LL-LH}$, etc. with the subscripts again indicating which filters were used in forming the subband. It is noted that further decompositions may be done to create more than 16 subbands. A hierarchical structure is thus obtained for the various subbands. The encoded subbands can later be decoded, and the original can be reconstructed with a given amount of error depending on the decoding technique. The reconstruction process is illustrated in FIG. 5 for the four-band system and in FIG. 6 for the 16-band system. The motivation for subband coding is the observation that the subbands can be encoded more efficiently than the full-band original image.

It is noted that the process of subband coding has similarities to the Burt pyramid scheme in that the subband scheme results in a subsampled lowpass filtered image at each level of the subband decomposition, e.g., $Y_{LL}$, $Y_{LL-LL}$, etc. The remaining subbands at each level are analogous to a decomposition of the residual images in the Burt pyramid. A progressive improvement in image quality can thus be obtained in subband coding by displaying the various levels of lowpass filtered images in manner similar to the Burt pyramid. Also note that in subband coding, reconstruction errors at one level will propagate to the next level.

Referring to FIG. 7, the patent by Adelson et al. (U.S. Pat. No. 4,817,182) teaches a refinement of the technique described by Woods et al. In Adelson's approach, only the subband corresponding to the lowpass filtered image at each level ($Y_{LL}$, $Y_{LL-LL}$, etc.) is further decomposed into additional subbands. This results in a nonuniform hierarchical structure. This technique is motivated by the observation that further decomposition of the lowpass filtered subband results in the largest increase in coding efficiency and that it is computationally simpler to decompose only the lowpass subband rather than all the subbands. The decoding process for the nonuniform structure is illustrated in FIG. 8.

There are three primary limitations in using the techniques described in the prior art for a multiuse environment:

To reconstruct the lowpass signal at a given resolution level, all lower resolution images must be reconstructed first. This requires substantial hardware and processing time. In particular, the subband coding approach requires a relatively large number of filtering operations to generate higher resolution images from the lower resolution images.

The techniques require quantization of the hierarchical image data to achieve significant compression. If the hierarchy contains many levels of resolution (as is required in the multiuse scenario), significant degradation may occur at the highest resolution level owing to the propagation of quantization noise. Since Applicants' system requires very high quality at the highest resolution level (for photographic hardcopies), this situation is undesirable.

The image decomposition via the Burt pyramid is not as efficient in compressing the data as is the subband approach. As pointed out previously, the subband approach can roughly be viewed as a further decomposition of the residual images in the Burt pyramid, and this allows for additional compression. Also, the subband approach of Adelson et al. which uses a nonuniform-tree structure in the decomposition provides less compression than does a full-tree subband structure (albeit with reduced computational complexity.)

SUMMARY OF THE INVENTION

The present invention overcomes these limitations by using a hybrid scheme which permits fast reconstruction of the lower resolution images with relatively simple hardware while yielding very high reconstruction quality at the highest resolution level. Furthermore, the image hierarchy can still be encoded efficiently, i.e., at a low bit rate, and stored in such a manner that it can be accessed efficiently when being read from the storage medium. It is assumed that all image data is encoded using an entropy coding technique such as Huffman coding or Q-coding with some quantization prior to encoding. However, in some embodiments, it may be advantageous to store the data without entropy encody in order to provide immediate access to these records or to further process the data prior to encoding, e.g., use a differential pulse code modulation (DPCM) scheme, to improve the coding efficiency. To some extent, Applicants' technique effectively decouples the lower resolution images from the higher resolution images to prevent the propagation of quantization noise from the lower levels and to provide quick access to the lower resolution images.

The above and other objects of the present invention will become more apparent when taken in conjunction with the following description and drawings wherein like characters indicate like parts and which drawings form a part of the present invention.

DESCRIPTION OF THE PREFERRED EMBODIMENTS

Figure 1:
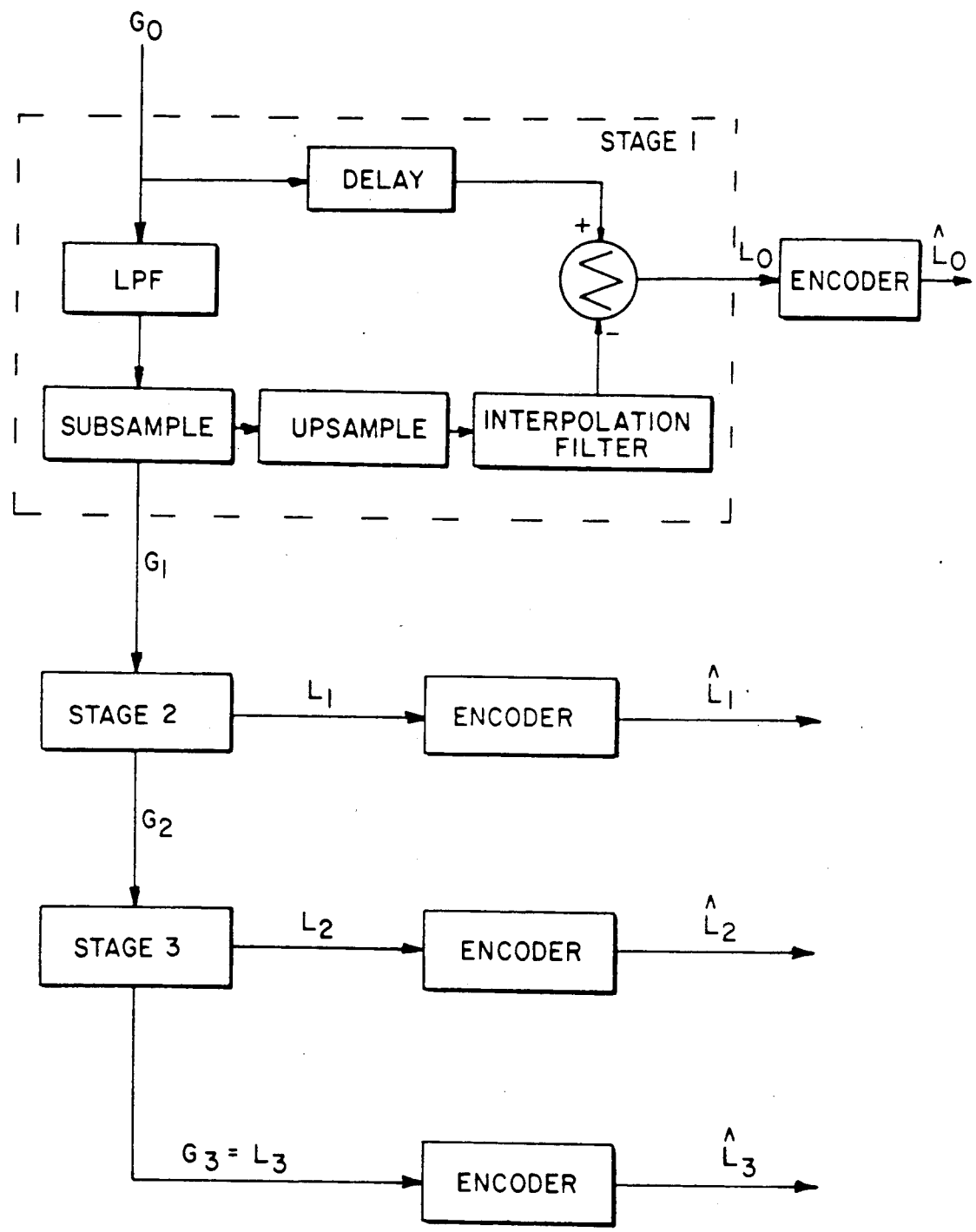
FIG. 1 is a block diagram illustrating a prior art pyramid residual image encoder method.
Figure 2:
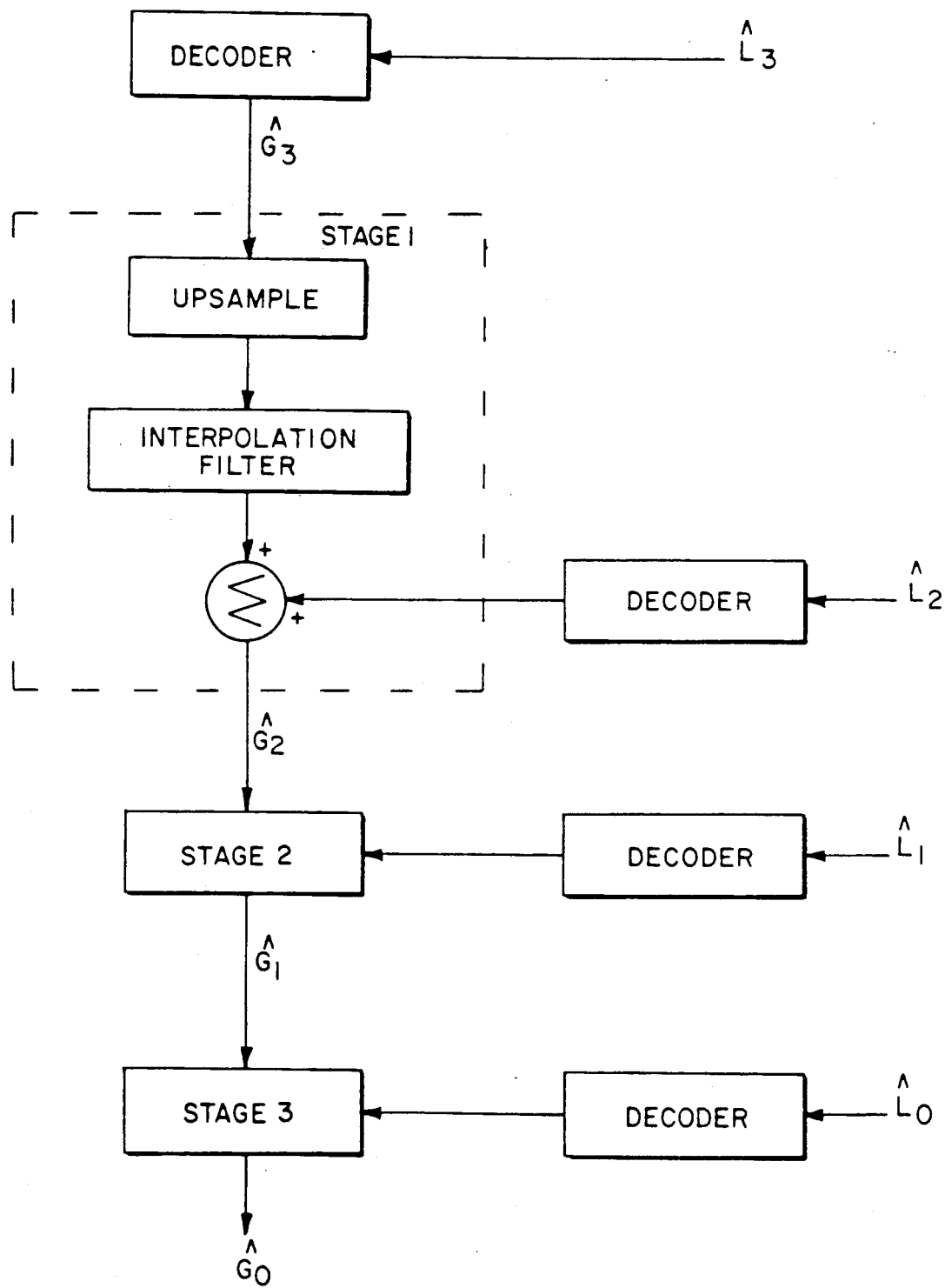
FIG. 2 is a block diagram illustrating a prior art pyramid residual image decoder method.
Figure 3:
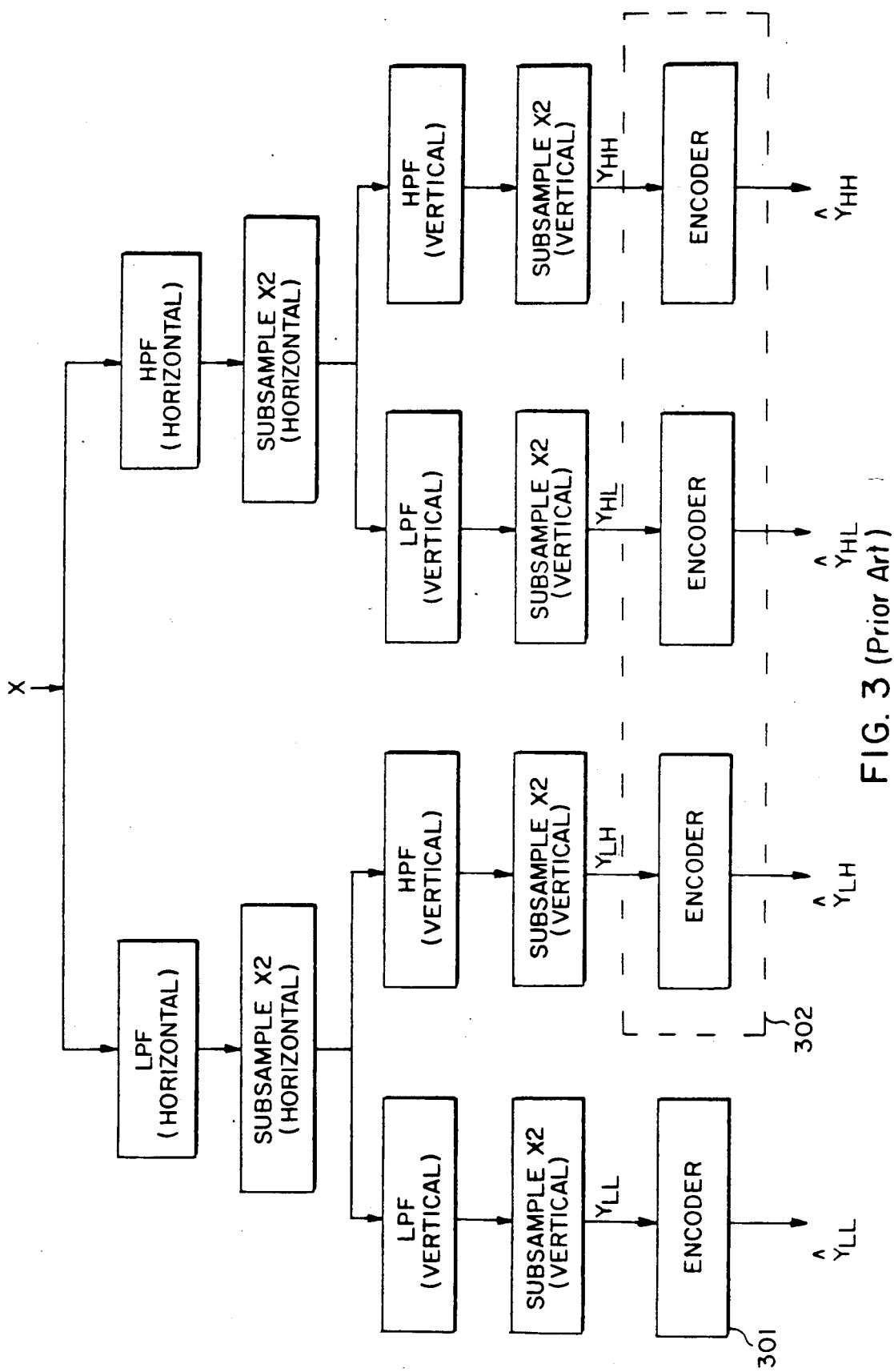
FIG. 3 is a block diagram illustrating a first prior art subband encoder method.
Figure 4:
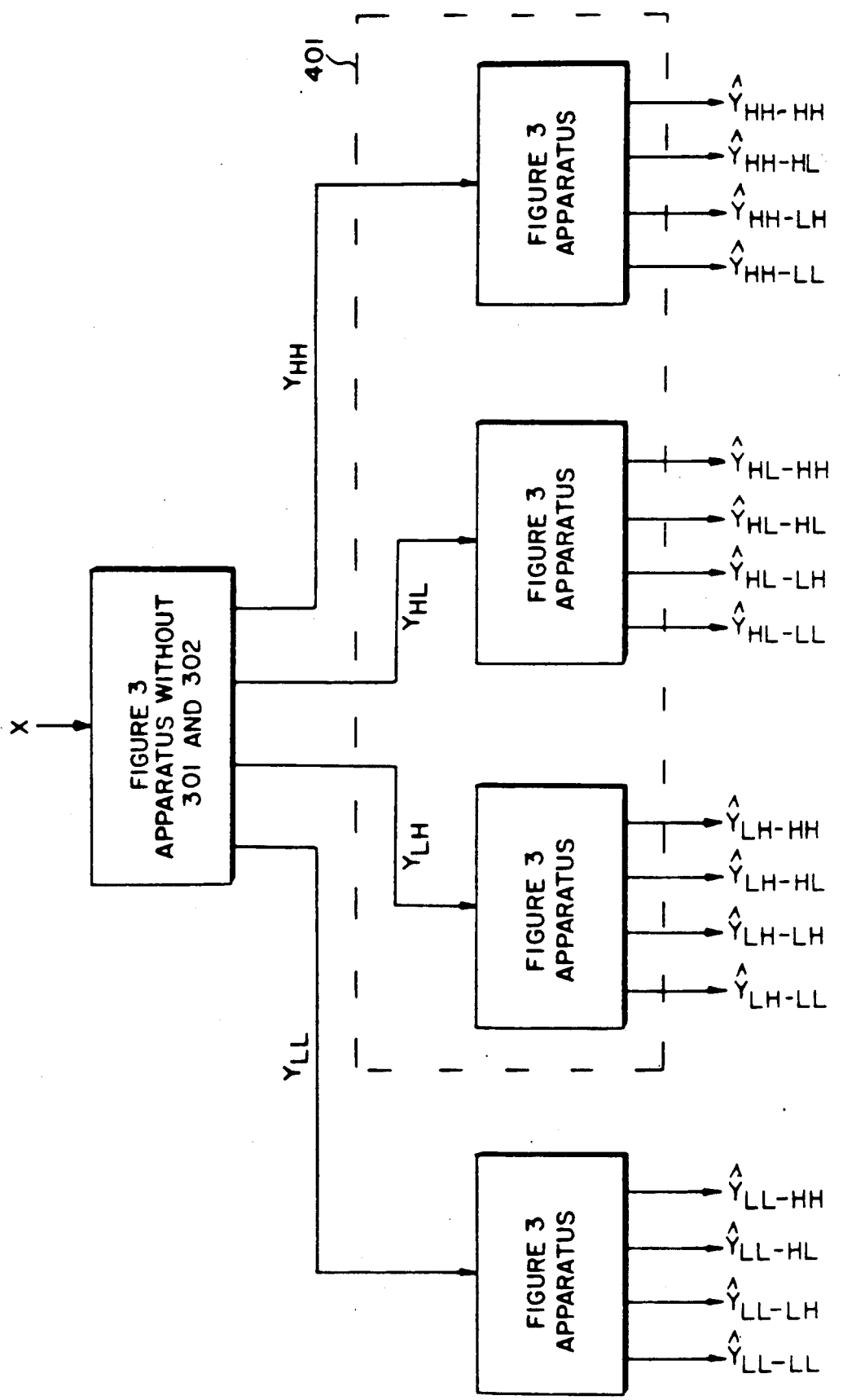
FIG. 4 is a block diagram illustrating a second prior art subband encoder method.
Figure 5:
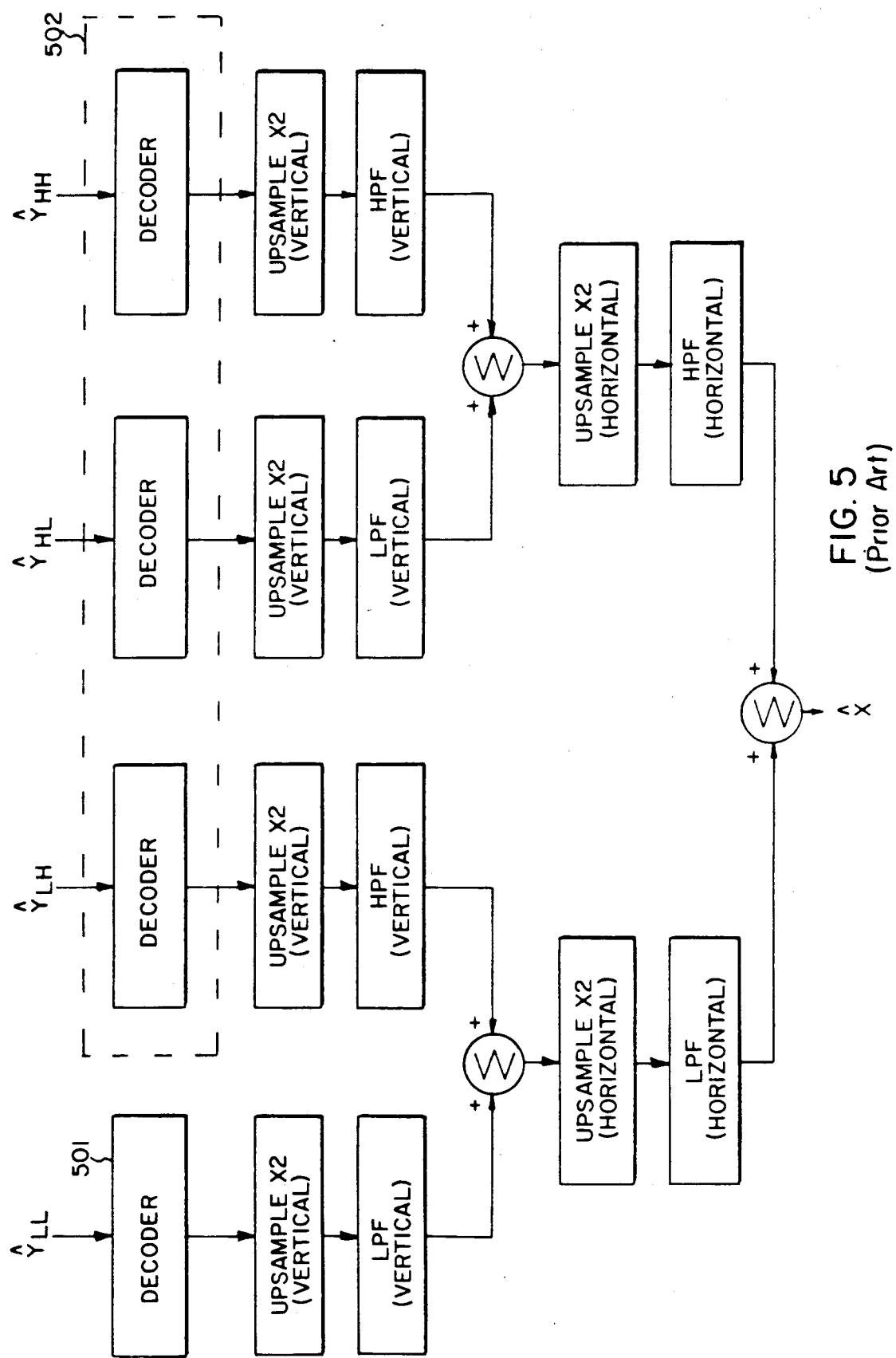
FIG. 5 is a diagram illustrating a first prior art subband decoder method.
Figure 6:
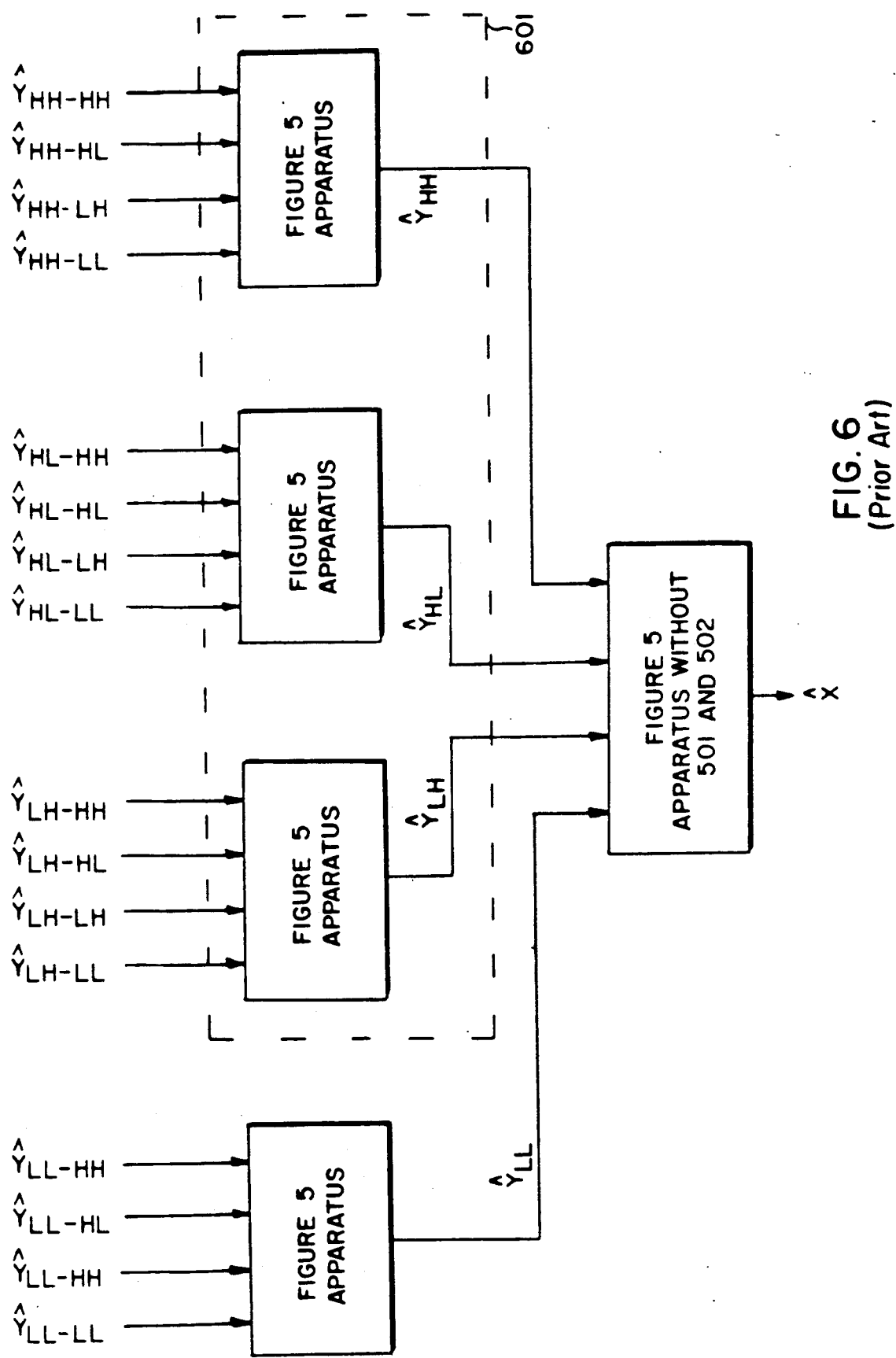
FIG. 6 is a block diagram illustrating a second prior art subband decoder method.
Figures 7, 8:
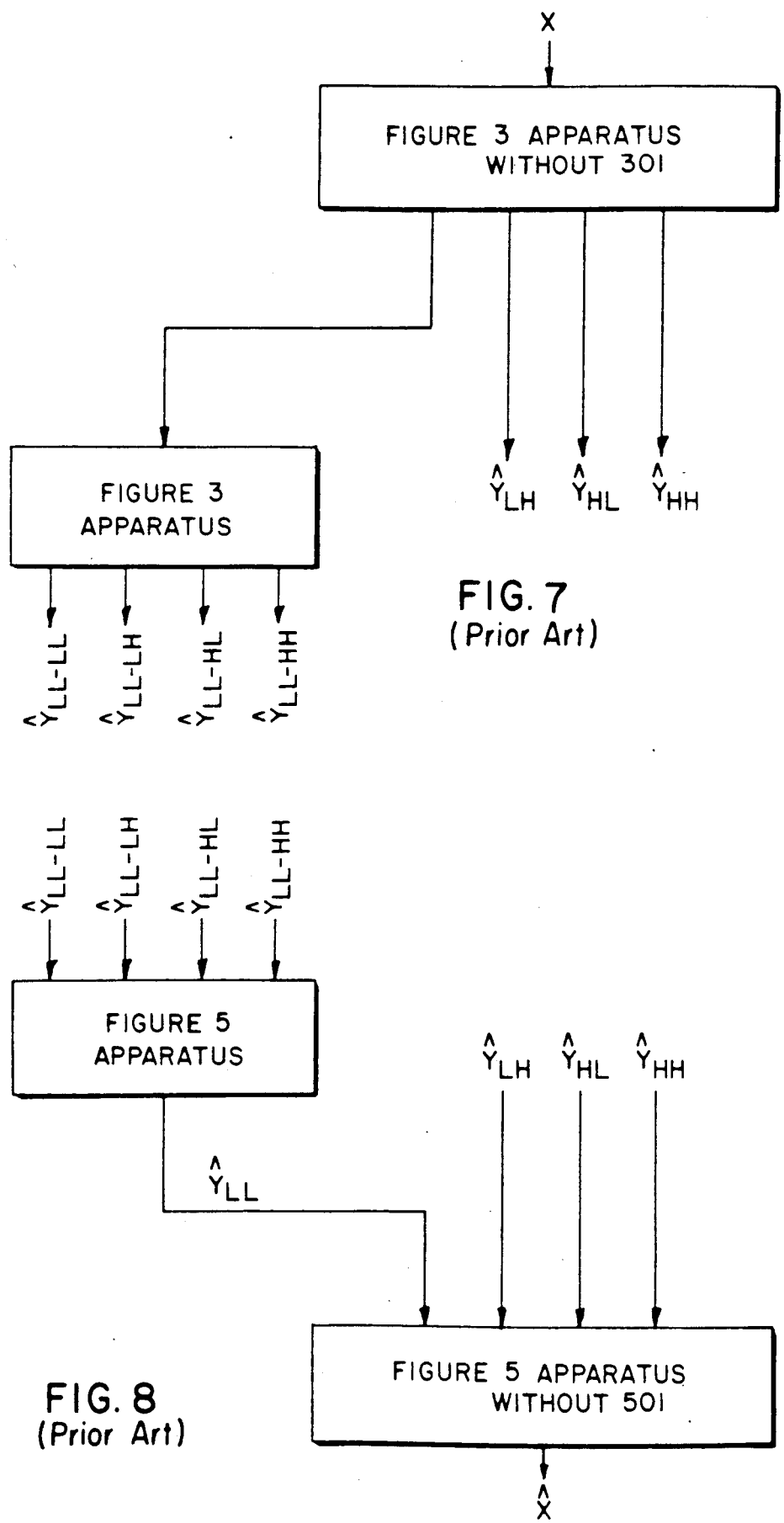
FIG. 7 is a block diagram illustrating a third prior art subband encoder method.
FIG. 8 is a block diagram illustrating a third prior art subband decoder method.
Figure 9:
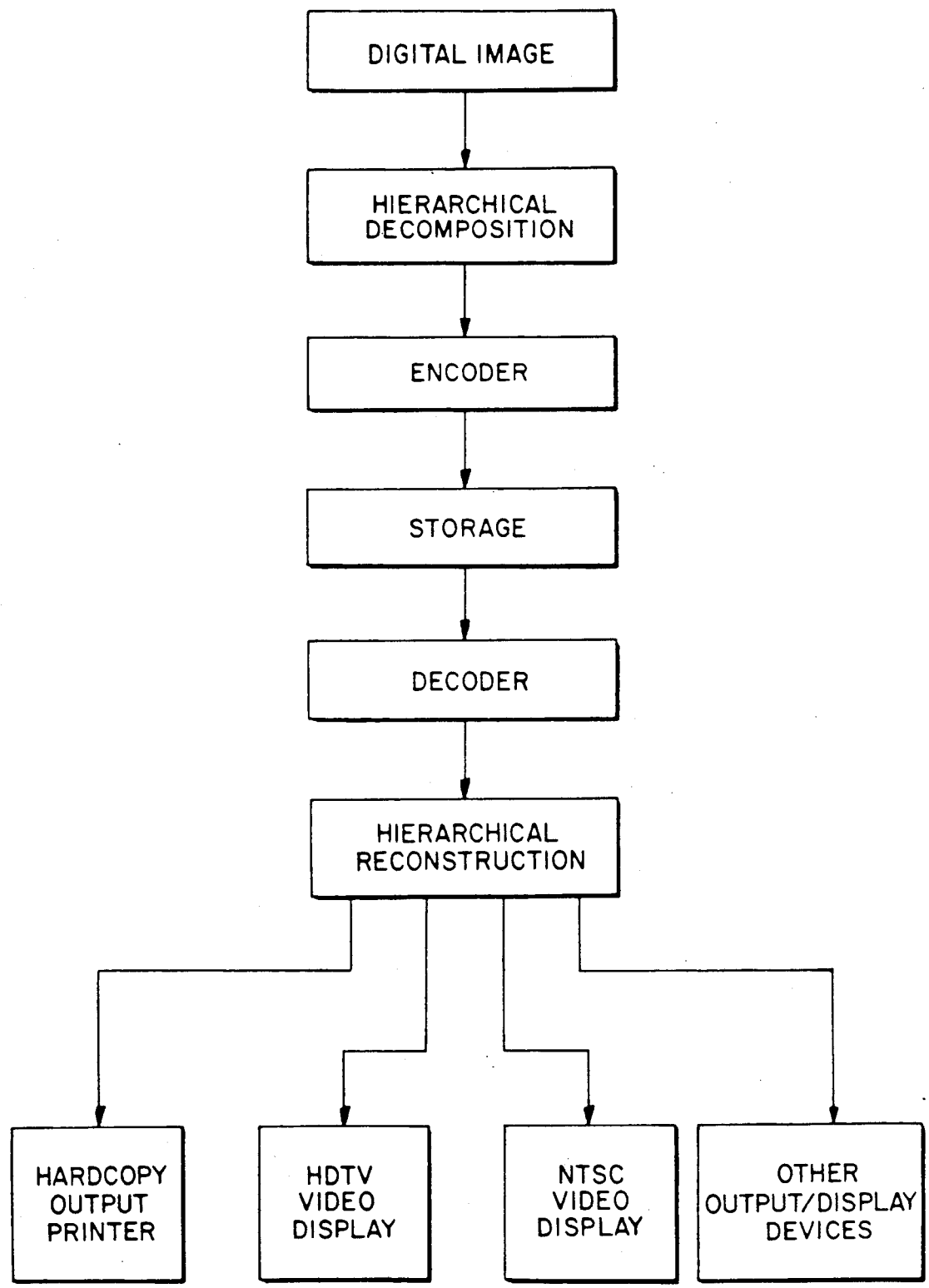
FIG. 9 is a block diagram illustrating the hierarchical storage and display method.

In the following discussion, it is assumed that the highest resolution image is composed of 2048×3072 pixels and that this resolution is adequate to produce photographic quality originals on an appropriate digital output device. It is also assumed that the lowest resolution level is composed of 256×384 pixels and that this resolution is adequate for preliminary, but relatively low quality, display on an NTSC-quality video monitor. The other resolution levels are 512×768 pixels for high quality display on an NTSC-quality video monitor and 1024×1536 for high quality display on proposed HDTV video monitors. These resolutions will be denoted as 256 (for 256×384), 512 (for 512×768), 1K (for 1024×1536), and 2K (for 2048×3072) for convenience. The basic diagram for the hierarchical storage and display method is illustrated in FIG. 9. However, it is important to note that the invention is not limited to these resolutions or output devices. Indeed, many variations with other resolutions and output devices may be used, and these resolutions may not necessarily be related to each other by some power of two as the previously described resolutions are (assuming some form of interpolation is available.) In addition, the number of resolution levels and the type of decomposition at each level may vary to some extent, yet still be consistent with the described embodiments. Also, the systems are described for a single channel image, i.e., one color or luminance image, but the systems may be extended to handle full color images.

1. Subband Coding With Progressing Partitioning

Figure 10:
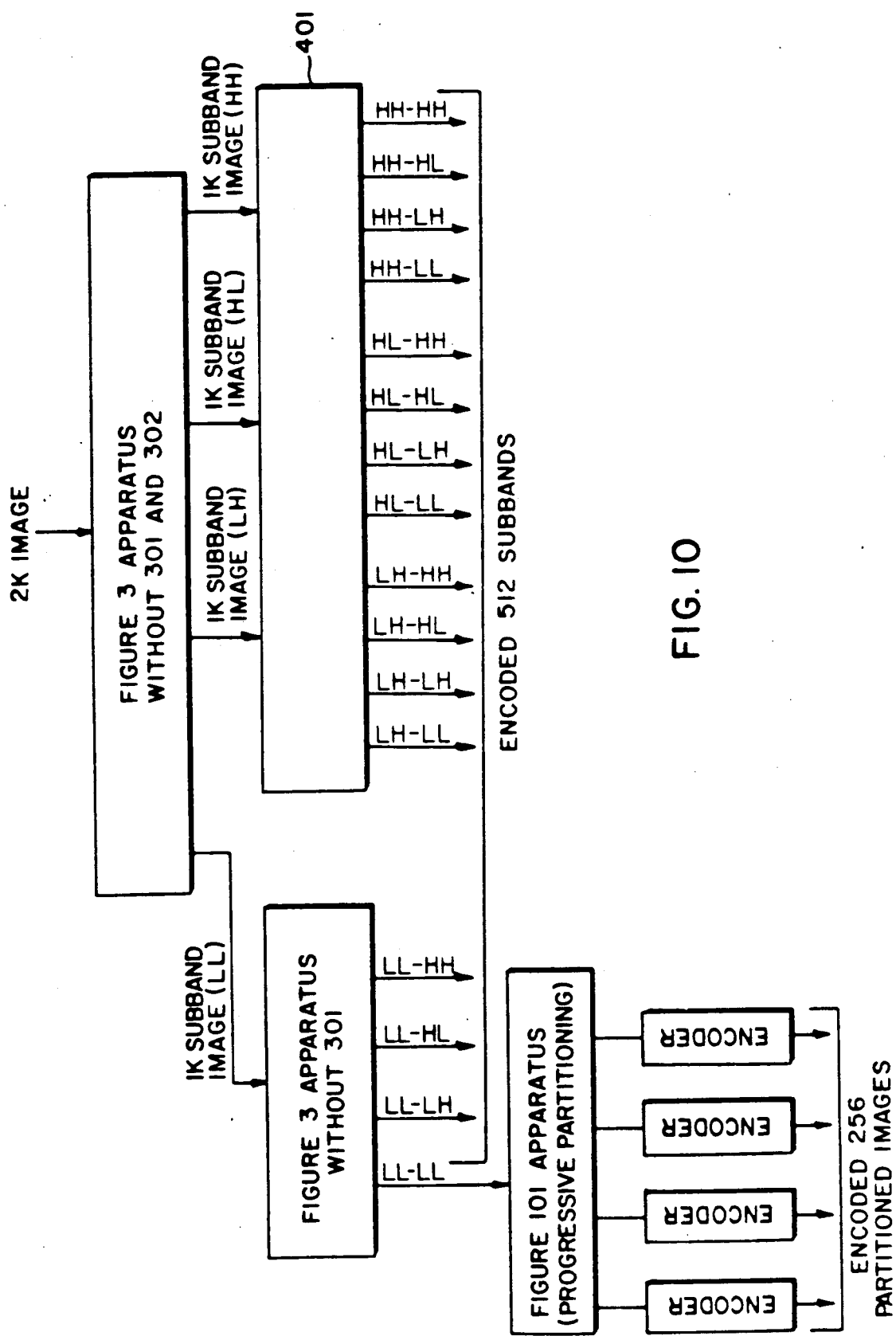
FIG. 10 is a block diagram illustrating the encoder portion of a first preferred embodiment of the present invention using subband coding with progressive partitioning.
Figure 11:
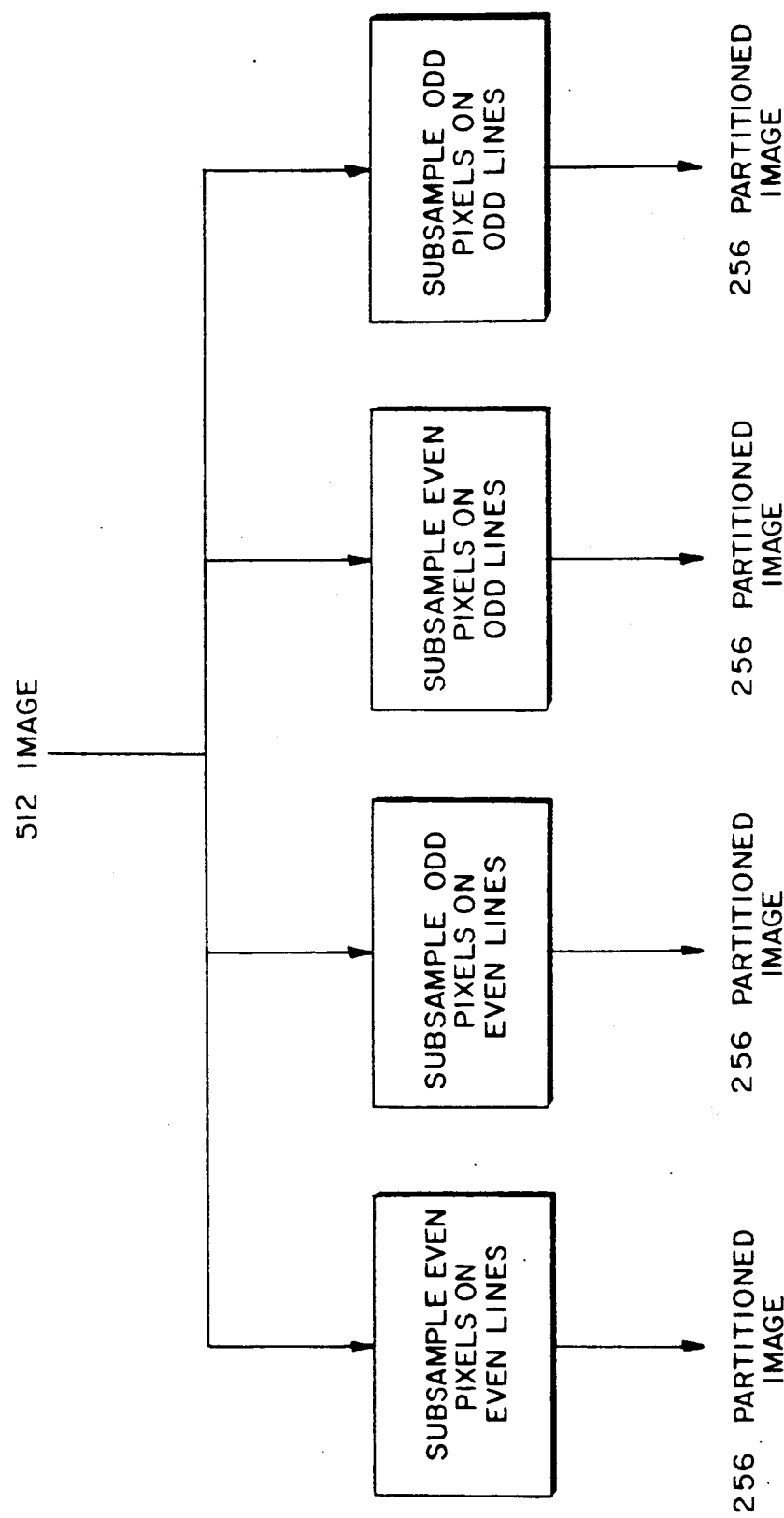
FIG. 11 is a block diagram illustrating the progressive partitioning of a full resolution image into lesser resolution images.
Figure 12:
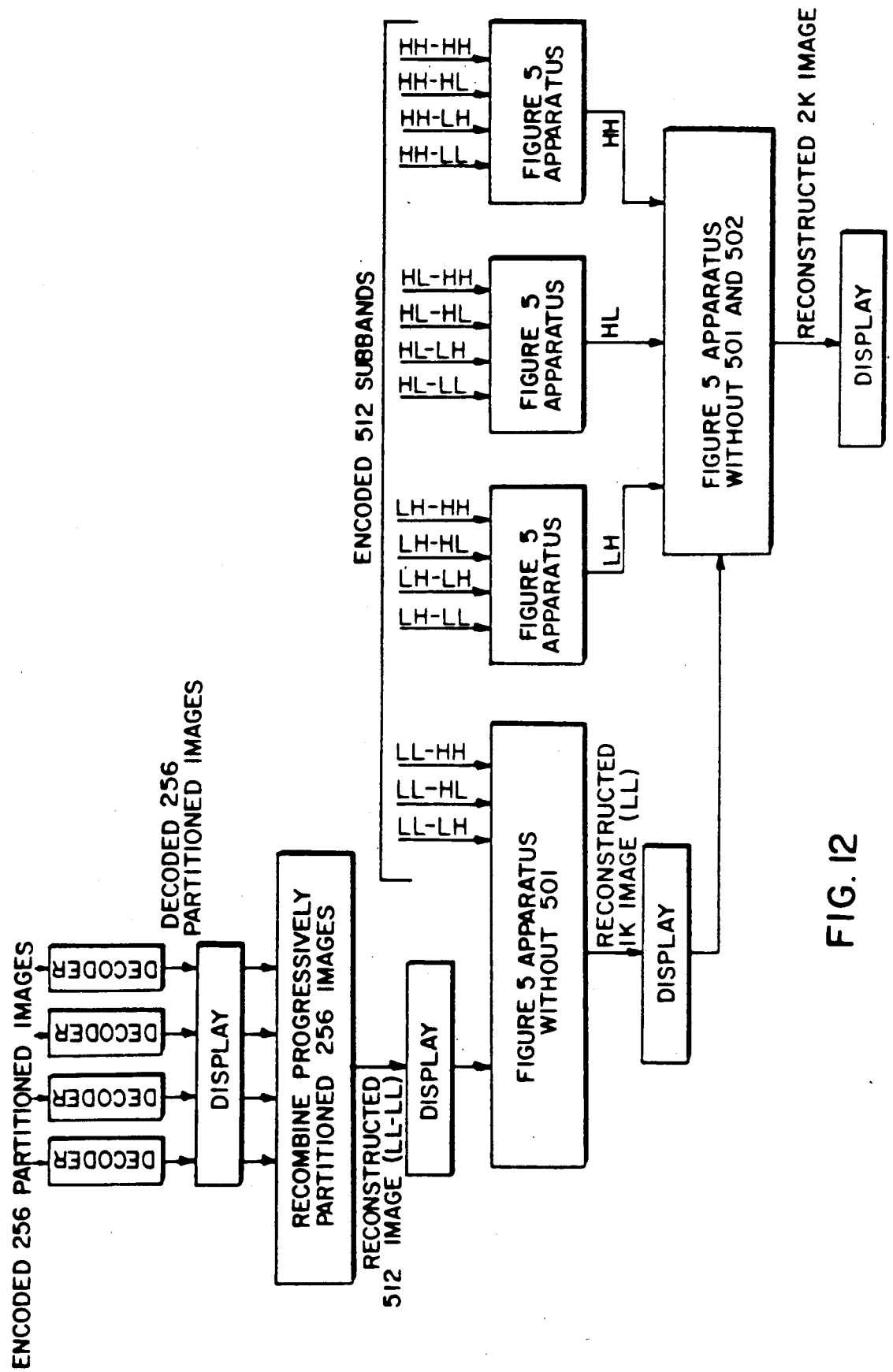
FIG. 12 is a block diagram illustrating the decoder portion of a first preferred embodiment of the present invention using subband coding with progressive partitioning.

In the first embodiment, illustrated in FIG. 10, the 2K image is decomposed using a full two-level subband tree structure to generate sixteen 512 subband images. To further decompose the lowest frequency 512 image, a separate technique is used, namely, progressive partitioning, where the lowest frequency 512 image is partitioned into four 256 images by subsampling the 512 image in a staggered fashion as shown in FIG. 11. The information to be stored is then composed of the four 256 images (which can be used to reconstruct the lowest frequency 512 image) and the remaining 512 subbands. This information is then used to reconstruct the 1K images and the 2K images, the reconstruction process is illustrated in FIG. 12. As noted previously, the lowest frequency subband image at any resolution level is the one used for the purpose of display. This technique is motivated by the following:

The 256 image(s) can be created and displayed without any special/additional hardware.

The 512 lowest frequency image can be built up and displayed in a progressive manner without any special hardware using one or more of the 256 images. Also, since the 256 images are direct subsamples of the 512 image, the reconstruction of the 512 image can be done without the addition of any quantization noise in excess of what it originally contained.

The lowest resolution image is effectively decoupled from the higher resolution images to minimize the propagation of quantization noise to the higher levels.

This technique is efficient in terms of nonredundant storage of the image data, and the extensive use of the subband representation allows for significant image compression.

However, the extensive use of subbands in this approach is also a disadvantage in that many filtering operations are required to generate the 1K and 2K images.

2. Subband Coding With Direct Access to 256, 512, and 1K Images

Figure 13:
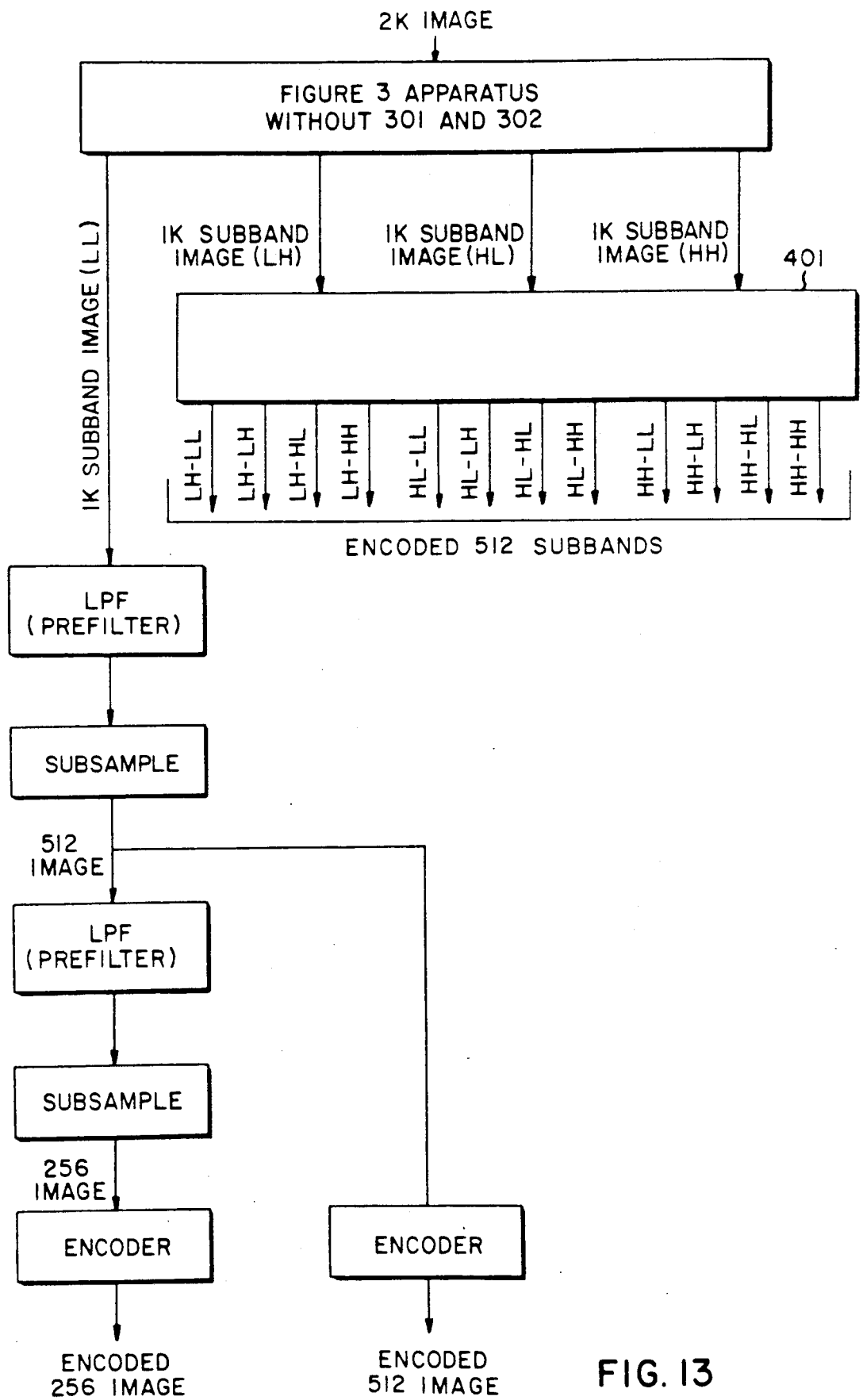
FIG. 13 is a block diagram illustrating the encoder portion of a second preferred embodiment of the present invention using subband coding with direct access to multiresolution images.
Figure 14:
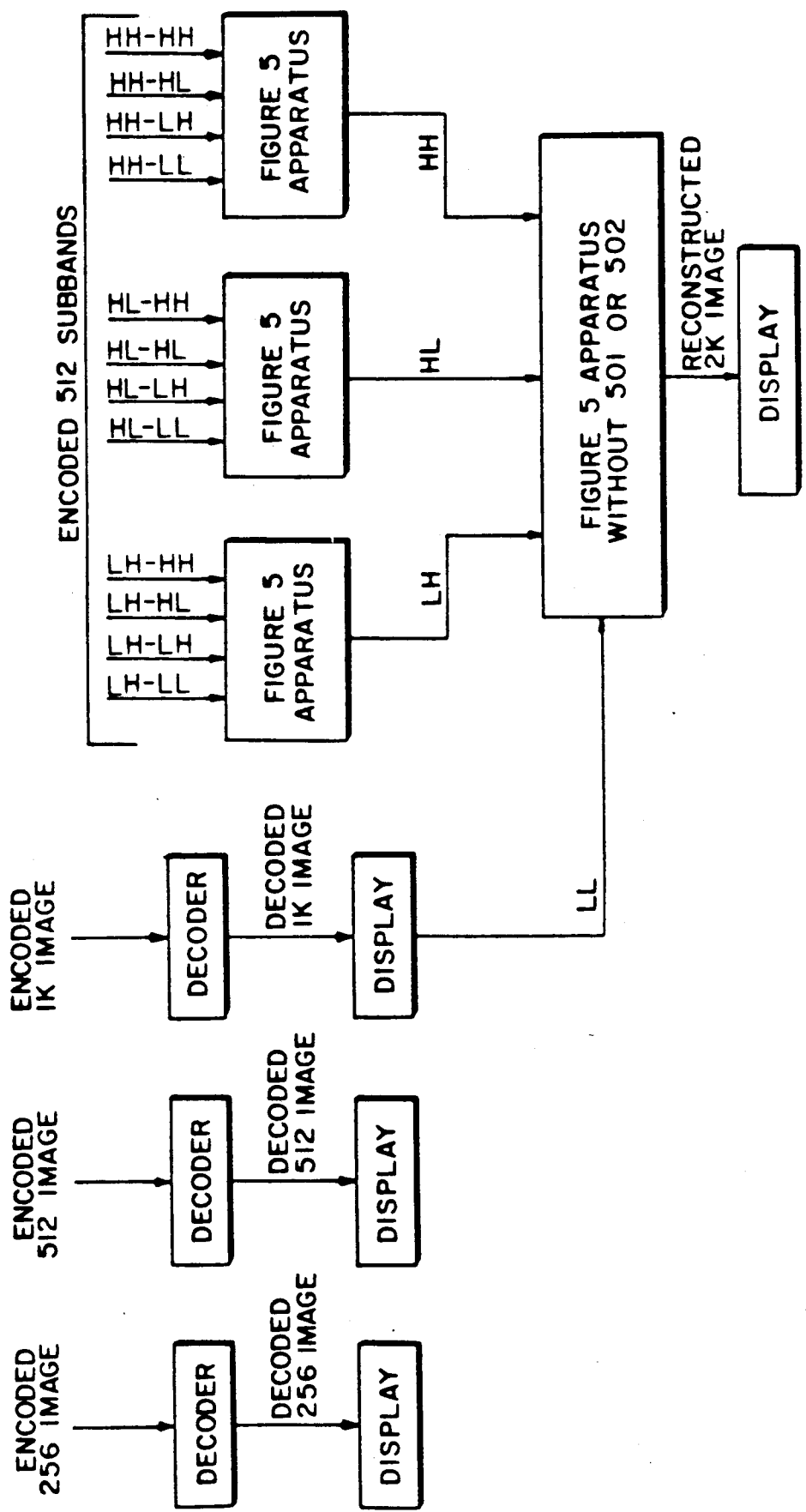
FIG. 14 is a block diagram illustrating the decoder portion of a second preferred embodiment of the present invention using subband coding with direct access to multiresolution images.

In the second embodiment, illustrated in FIG. 13, the problem of many filtering operations is reduced somewhat by using the subband tree structure to a lesser extent. In this approach, the 2K image is broken into four 1K subbands, then only the three higher frequency 1K subbands are further decomposed into a local of twelve 512 subbands. The lowest frequency 1K subband is not decomposed into a multitude of 512 images, but is merely prefiltered and subsampled to create a 512 image suitable for display. This 512 image is then prefiltered and subsampled to generate the 256 image. The information to be stored consists of the 256 image, the 512 image, the 1K image, and the twelve 512 higher frequency subbands. The reconstruction process for this information is illustrated in FIG. 14. The advantages of this approach are:

The 256, 512, and 1K images are all directly available for display with no special hardware or filtering operations, while the use of subband coding on the remaining data still allows for significant image compression.

The lower resolution images are more completely decoupled from the 2K image so that very high fidelity can be achieved at the 2K level.

The 256 and 512 images can be prefiltered using better filters, i.e., sharper transition bands, than those used for the subband formation, resulting in higher quality.

The tradeoff with this approach is that additional storage is required since redundancy is increased by storing the 256, 512 and 1K images separately.

3. Subband Coding with Burt Pyramid

Figure 15:
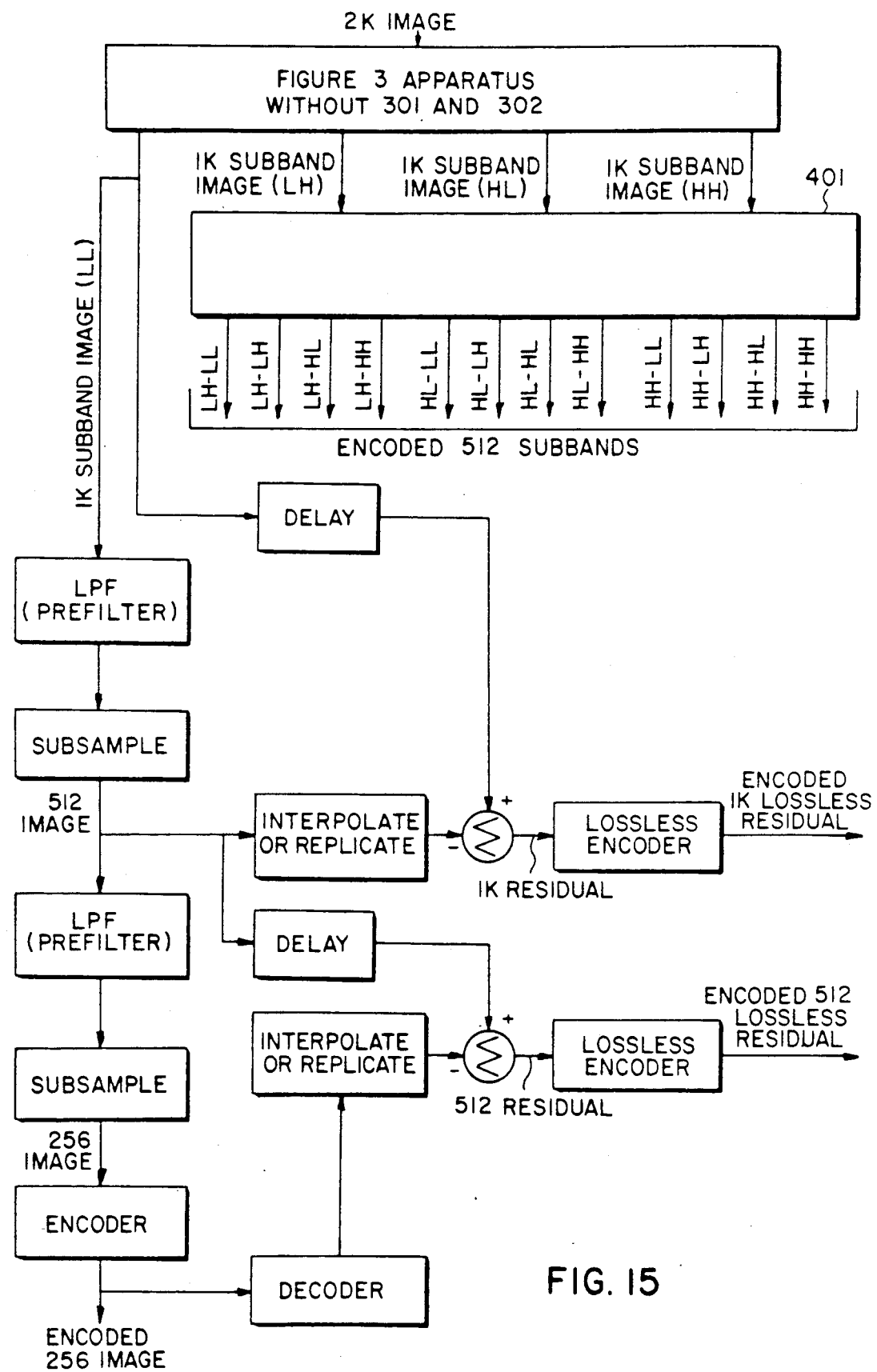
FIG. 15 is a block diagram illustrating the encoder portion of a third preferred embodiment of the present invention using subband coding with a lossless residual image process.
Figure 16:
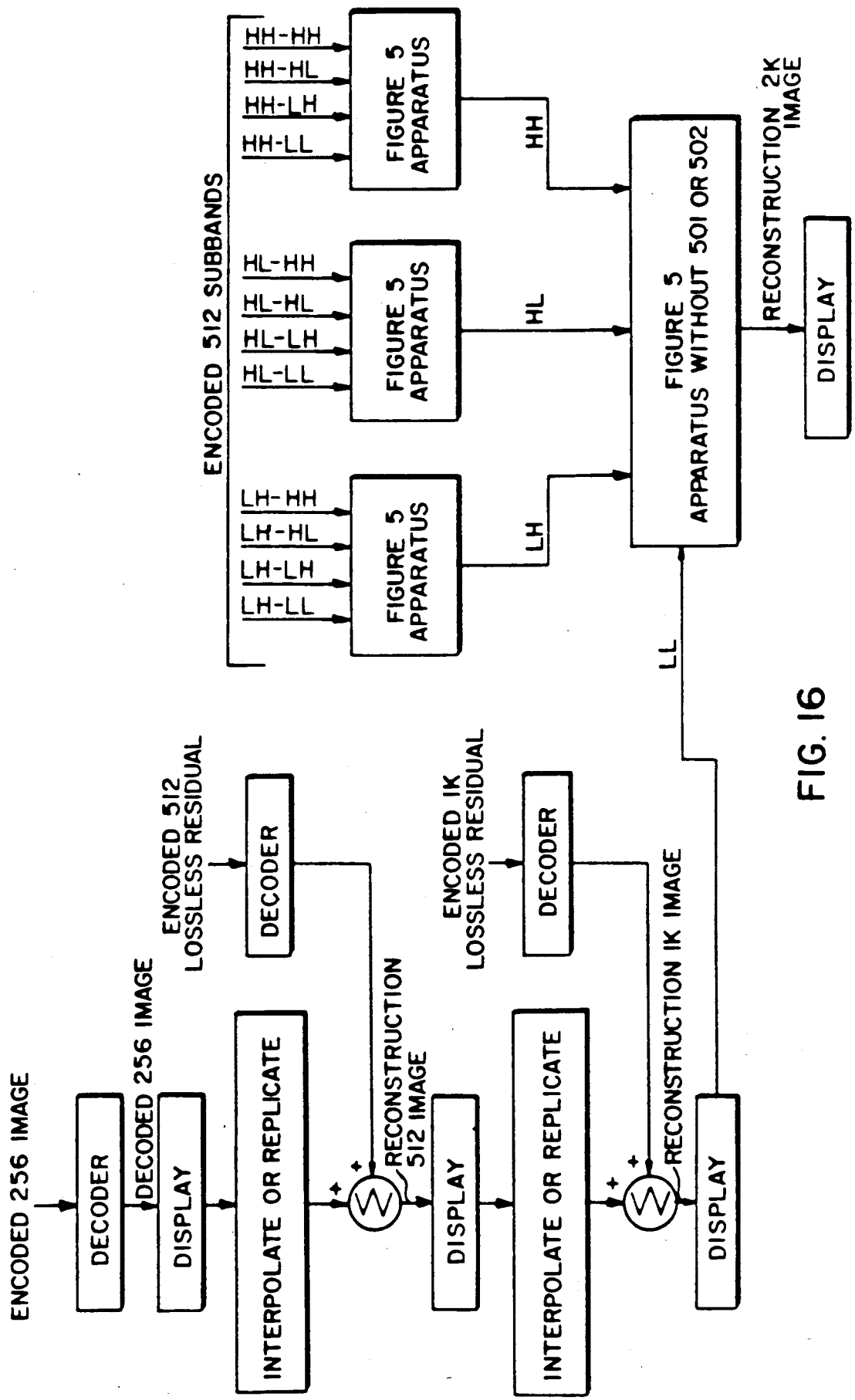
FIG. 16 is a block diagram illustrating the decoder portion of a third preferred embodiment of the present invention using subband coding with a lossless residual image process.

The third embodiment illustrated in FIG. 15, is similar to the previous approach in that the 2K image is decomposed into four 1K subband images, and then the three higher frequency 1K subbands are decomposed into twelve 512 subbands. Also, as before, the lowest frequency 1K subband is then prefiltered and subsampled to yield a 512 image, and this 512 image is also prefiltered and subsampled to yield a 256 image. However, in this embodiment, the 512 and 1K images are not stored for direct access. Instead, the 256 image is replicated or interpolated up to a 512 size, and this interpolated image is used as a prediction image to generate a 512 residual image. Similarly, the 512 image is interpolated or replicated to a 1K size, and this interpolated image is used as a prediction image to generate a 1K residual image. In both cases, these residual images are coded in a lossless manner so that the 512 and 1K images can be recovered exactly. This approach is a combination of the Burt pyramind with lossless residuals for the lowpass images and subband coding for the remaining data. The information to be stored consists of the 256 base image, the 512 residual image, the 1K residual image, and twelve 512 subband images. The reconstruction process using this information is illustrated in FIG. 16. The advantages of this approach are:

The 256 image can be displayed directly.

The use of the lossless residuals in the prediction/residual component (the Burt pyramid) effectively decouples images at the lower resolution levels, so errors are not propagated. Also, as in the previous approach, the 2K image is more effectively decoupled from the lower resolution levels so that a high quality reconstruction can be obtained at the 2K level.

The 256 and 512 images can be prefiltered using better filters, i.e., sharper transition bands, than those used for the subband formation, potentially resulting in higher quality.

While this approach does not allow for immediate access to the 512 and 1K levels (as does the previous technique), it provides greater image compression than the previous technique.

However, it does not provide as much compression as the full subband approach, but it is more computationally efficient.

The subband filtering, the prefiltering prior to subsampling, and the interpolation to form the prediction images requires essentially the same hardware, so the implementation is relatively efficient.

The main disadvantage with this approach is the extra computations required to form the prediction/residual images as compared to the previous technique.

4. Subband Coding with Burt Pyramid and CD-I Compatibility

Figure 17:
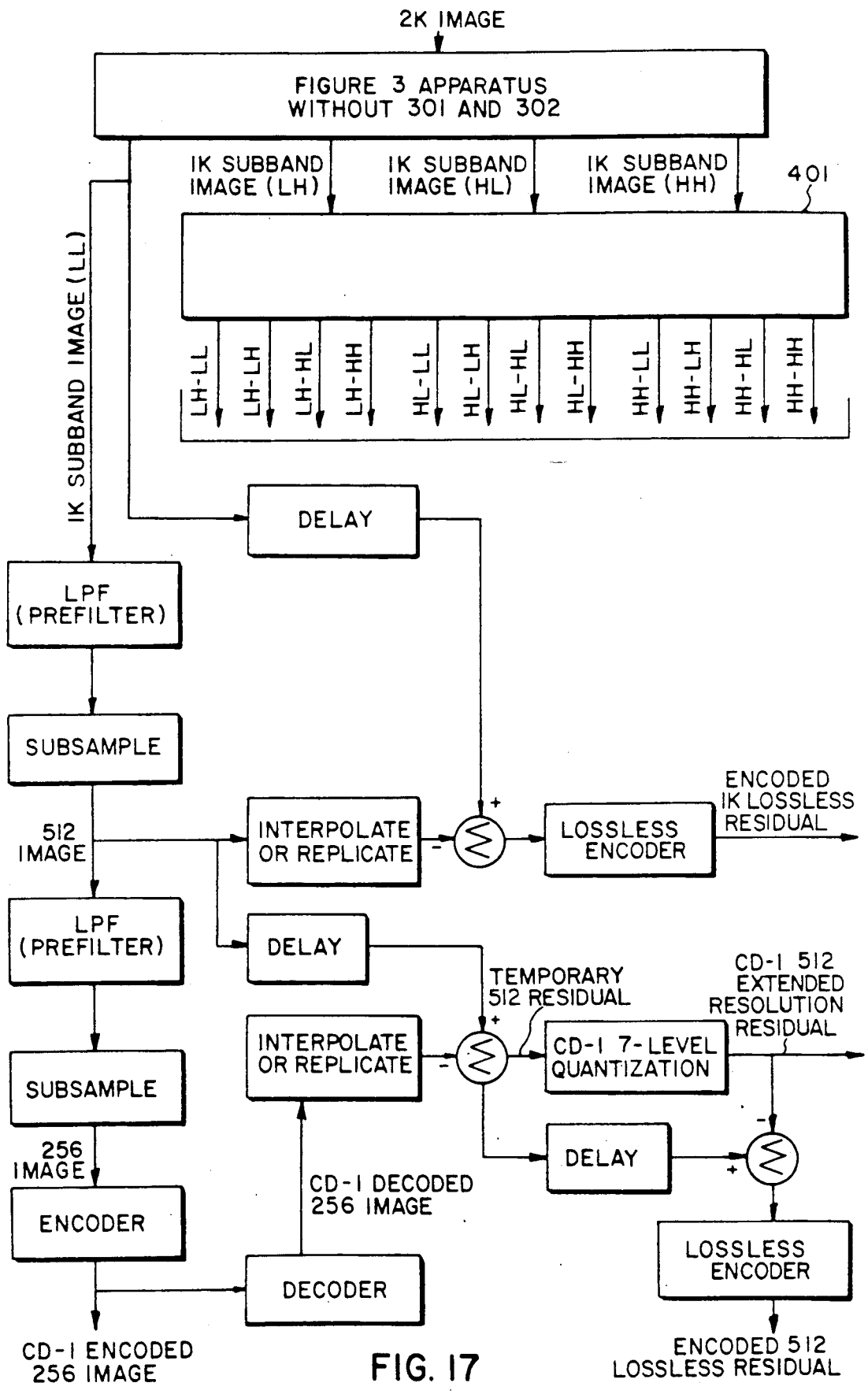
FIG. 17 is a block diagram illustrating the encoder portion of a fourth preferred embodiment of the present invention using subband coding with a lossless residual image process and CD-I compatibility.
Figure 18:
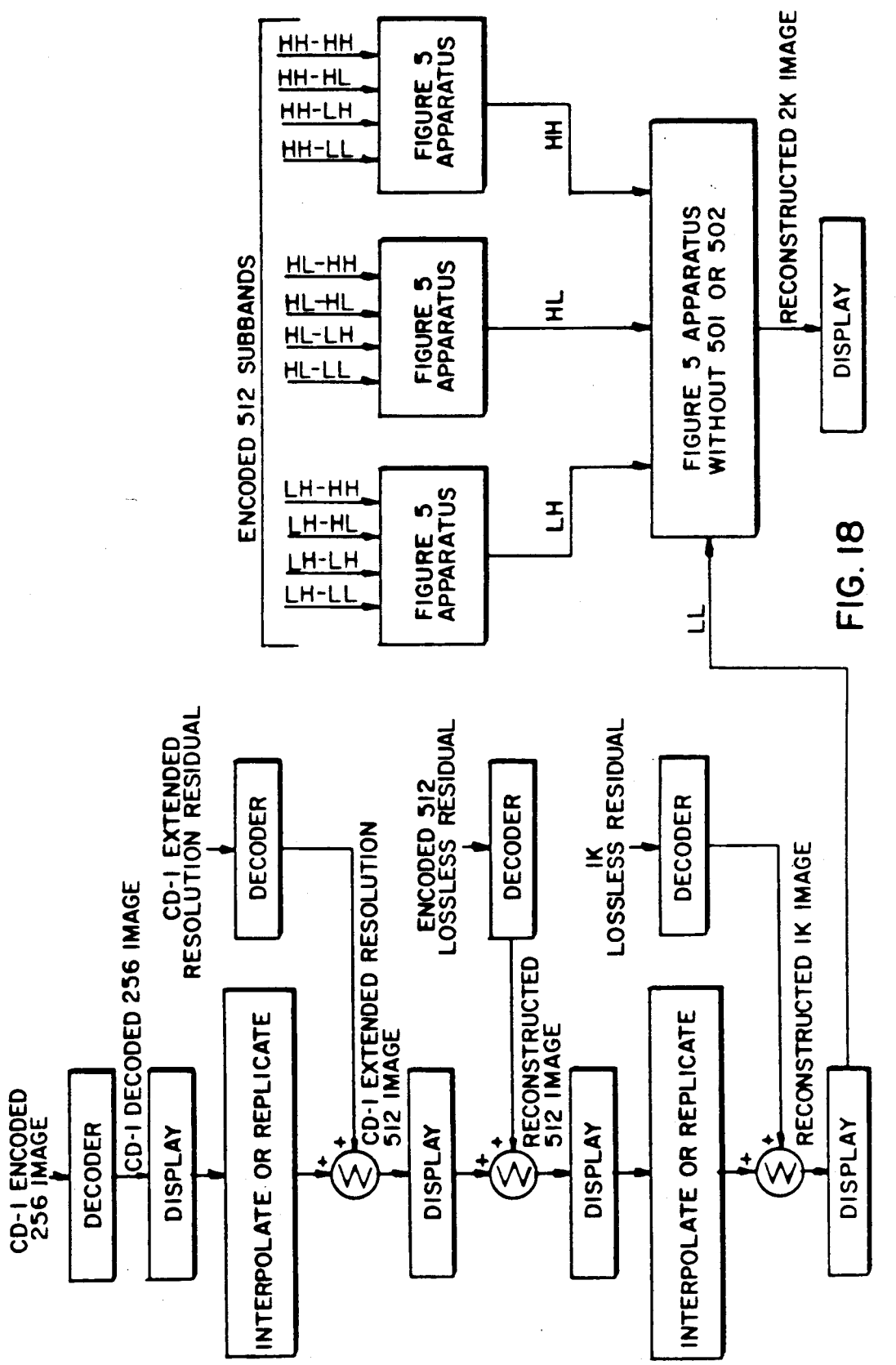
FIG. 18 is a block diagram illustrating the decoder portion of a fourth preferred embodiment of the present invention using subband coding with a lossless residual image process and CD-I compability.

Referring to FIG. 17, the fourth embodiment has a structure similar to the previous embodiment, but also incorporates the Philips CD-I (Compact Disc-Interactive) real-time video data format (as referenced in the publication by A. C. Luther in Prior Art) at the 256 and 512 levels in order to provide compatibility with this format. As before, the 2K image is decomposed into four 1K subbands, and the three higher frequency 1K subbands are further decomposed to form twelve 512 subbands. The lowest frequency 1K subband is then prefiltered and subsampled to form the 512 image. This 512 image is interpolated to form a 1K prediction image, and a 1K lossless residual image is created. Similarly, the 512 image is prefiltered and subsampled to form a 256 base image which an be interpolated or replicated to form a 512 prediction image and 512 residual image. Up to this point, this is the same process as the previous embodiment. However, the technique differs in the encoding of the 256 base image and the 512 residual image in order to be compatible with the CD-I format. First, the 256 base image is encoded using the CD-I encoding scheme, namely, differential pulse code modulation (DPCM), rather than an entropy coding technique as was used in the other embodiments. Second, the 512 residual image is not initially encoded in a lossless manner, but is first encoded using the CD-I "extended resolution" format which is a 7-bit quantization of the residual. A second 512 residual is then formed as the difference between the original 512 residual and the 7-bit CD-I residual. This second residual is losslessly encoded. The information to be stored thus consists of the CD-I 256 base image, the CD-I 512 extended resolution residual, the 512 lossless residual, the 1K lossless residual, and the twelve 512 subband images. The reconstruction process using this information is illustrated in FIG. 18. The advantage of this technique over the previous one is the compatibility with the CD-I format at the 256 and 512 levels.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

I claim:
1. A hierarchical storage method comprising the steps of:
   a) forming a digital representation of an image;
   b) decomposing said digital representation into multiple subband images each comprised of a band of spatial frequencies at one or more resolution levels, the series ranging from the lowest spatial frequency subband, to the highest defined by a);
   c) further decomposing the lowest frequency subband of step b) into a plurality of lower resolution images according to the following steps:
      1. subsampling the even-numbered pixels on the even-numbered lines to create a first partitioned image;
      2. subsampling the odd-numbered pixels on the even-numbered lines to create a second partitioned image;

3. subsampling the even-numbered pixels on the odd-numbered lines to create a third partitioned image;

4. subsampling the odd-numbered pixels on the odd-numbered lines to create the fourth partitioned image;

d) encoding and storing the partitioned images of step c); and e) encoding and storing the remaining subbands of step b).

2. A hierarchical display method according to claim 1 and further comprising the steps of:

retrieving and decoding one of said lower resolution images of step c); and displaying said one retrieved image.

3. A hierarchical display method according to claim 2 and further comprising the steps of:

retrieving and decoding at least one of the remainder of said lower resolution images of step c);

combining all of said retrieved images to form a higher resolution image for display; and displaying said combined retrieved image.

4. A hierarchical display method according to claim 1 and further comprising the steps of:

retrieving and decoding all of said lower resolution images of step c);

combining all of said retrieved lower resolution images to form a higher resolution image for display; and displaying said combined retrieved image.

5. A hierarchical display method according to claim 4 and further comprising the steps of:

retrieving and decoding the subbands at one or more resolution levels;

combining said combined retrieved image with said retrieved and decoded subbands to form a higher resolution image for display; and displaying said formed higher resolution image.

6. A hierarchical display method according to claim 5 and further comprising the steps of:

iterating the steps of claim 5 until a full resolution representation of the image of step a) is reconstructed and displayed.

7. A hierarchical storage method comprising the steps of:

a) forming a digital representation of an image;

b) decomposing said digital representation into multiple subband images, each comprised of a band of spatial frequencies, at one or more resolution levels ranging from the lowest spatial frequency subband to the highest defined by the digital representation of a);

c) further decomposing the lowest frequency subband of b) into a plurality of lower resolution images by;

iteratively lowpass filtering and subsampling the subband to create a plurality of lower resolution images;

encoding and storing the lower resolution images; and encoding and storing the remaining subbands of step b).

8. A hierarchical display method according to claim 7 and further comprising the steps of:

retrieving and decoding one of said lower resolution images of step c); and displaying said retrieved image.

9. A hierarchical display method according to claim 8 and further comprising the steps of:

retrieving and decoding the lowest frequency subband of step b); and displaying said retrieved image.

10. A hierarchical display method according to claim 9 and further comprising the steps of:

retrieving and decoding the subbands at one or more resolution levels;

combining said retrieved image with said retrieved and decoded subbands to form a higher resolution image for display; and displaying said higher resolution image.

11. A hierarchical display method according to claim 10 and further comprising the step of:

iterating the steps of claim 10 until a full resolution representation of the image of step a) is reconstructed and displayed.

12. A hierarchical storage method comprising the steps of:

a) forming a digital representation of an image;

b) decomposing said digital representation into multiple subband images, each comprised of a band of spatial frequencies at one or more resolution levels, ranging from the lowest spatial frequency subband to the highest defined by the digital representation of a);

c) further decomposing the lowest frequency subband of b) into a one or more lower resolution images by iteratively lowpass filtering and subsampling the subband;

d) encoding and storing the lowest resolution image of c);

e) further decomposing the remaining lower resolution images of c) according to the following steps:

1. decoding the lowest resolution image of d);

2. interpolating or replicating said image to the dimensions of the next higher resolution level to form a prediction image;

3. subtracting said prediction image from the next higher resolution image formed in c) to create a residual image;

4. losslessly encoding and storing said residual image; and 5. iterating steps 2, 3, and 4 for each remaining image in c) to create a hierarchy of losslessly encoded residual images.

13. A hierarchical display method according to claim 12 and further comprising the steps of:

retrieving and decoding said lowest resolution image of step c); and displaying said retrieved image.

14. A hierarchical display method according to claim 13 and further comprising the steps of:

interpolating or replicating said retrieved image to the dimensions of the next higher resolution level to form a prediction image;

retrieving and decoding the lowest resolution residual image of step e);

adding said prediction image to said decoded residual image to reconstruct an image for display; and displaying said reconstructed image.

15. A hierarchical display method according to claim 14 and further comprising the steps of:

iterating the steps of claim 14 for each remaining residual of e) until the lowest frequency subband image of b) is reconstructed; and displaying said reconstructed image.

16. A hierarchical display method according to claim 15 and further comprising the steps of:
  retrieving and decoding the subbands at one or more resolution levels;
  combining said reconstructed image with said retrieved and decoded subbands to form a higher resolution image for display; and
  displaying said formed higher resolution image.

17. A hierarchical display method according to claim 16 and further comprising the step of:
  iterating the steps of claim 16 until a full resolution representation of the image of step a) is reconstructed and displayed.

18. A hierarchical storage method comprising the steps of:
  a) forming a digital representation of an image;
  b) decomposing said digital representation into multiple subband images, each comprised of a band of spatial frequencies at one or more resolution levels, ranging from the lowest spatial frequency subband to the highest defined by a digital representation of a);
  c) further decomposing the lowest frequency subband of b) into a one or more lower resolution images by iteratively lowpass filtering and subsampling the subband until the lowest resolution image has dimensions of 256 pixels × 384 lines;
  d) encoding and storing the lowest resolution image of c) using the Philips CD-I (Compact Disc-Interactive) real-time video data format;
  e) further decomposing the remaining lower resolution images of c) according to the following steps:
    1. decoding the lowest resolution image of d);
    2. interpolating or replicating said image to the dimensions of the next higher resolution level to form a prediction image;
    3. subtracting said prediction image from the next higher resolution image formed in c) to create a residual image;
    4. quantizing said residual image using the Philips CD-I 7-level quantization scheme to form a CD-I extended resolution residual;
    5. encoding and storing said CD-I extended resolution residual using the Philips CD-I real-time video data format;
    6. subtracting said CD-I extended resolution residual from residual of step 3 to form another residual;
    7. losslessly encoding and storing the residual image; and
    8. iterating steps 2, 3, and 7 for each remaining image in c) to create a hierarchy of losslessly encoded residual images.

19. A hierarchical display method according to claim 18 and further comprising the steps of:
  retrieving and decoding said lowest resolution image of step c); and
  displaying said retrieved image.

20. A hierarchical display method according to claim 19 and further comprising the steps of:
  interpolating or replicating said retrieved image to the dimensions of the next higher resolution level to form a prediction image;
  retrieving and decoding the CD-I extended resolution residual of step e);
  adding said prediction image to said decoded residual image to reconstruct an image for display; and
  displaying said reconstructed image.

21. A hierarchical display method according to claim 20 and further comprising the steps of:
  interpolating or replicating said reconstructed image to the dimensions of the next higher resolution level to form a prediction image;
  retrieving and decoding the losslessly encoded residual of step e);
  adding said prediction image to said decoded residual image to reconstruct an image for display; and
  displaying said reconstructed image.

22. A hierarchical display method according to claim 21 and further comprising the steps of:
  iterating the steps of claim 21 for the remaining residuals of e) until the lowest frequency subband image of b) is reconstructed; and
  displaying said reconstructed image.

23. A hierarchical display method according to claim 22 and further comprising the steps of:
  retrieving and decoding the subbands at one or more resolution levels;
  combining said reconstructed image with said retrieved and decoded subbands to form a higher resolution image for display; and
  displaying said formed higher resolution image.

24. A hierarchical display method according to claim 23 and further comprising the step of:
  iterating the steps of claim 23 until a full resolution representation of the image of step a) is reconstructed and displayed.

* * * * *